Patented Feb. 1, 1938

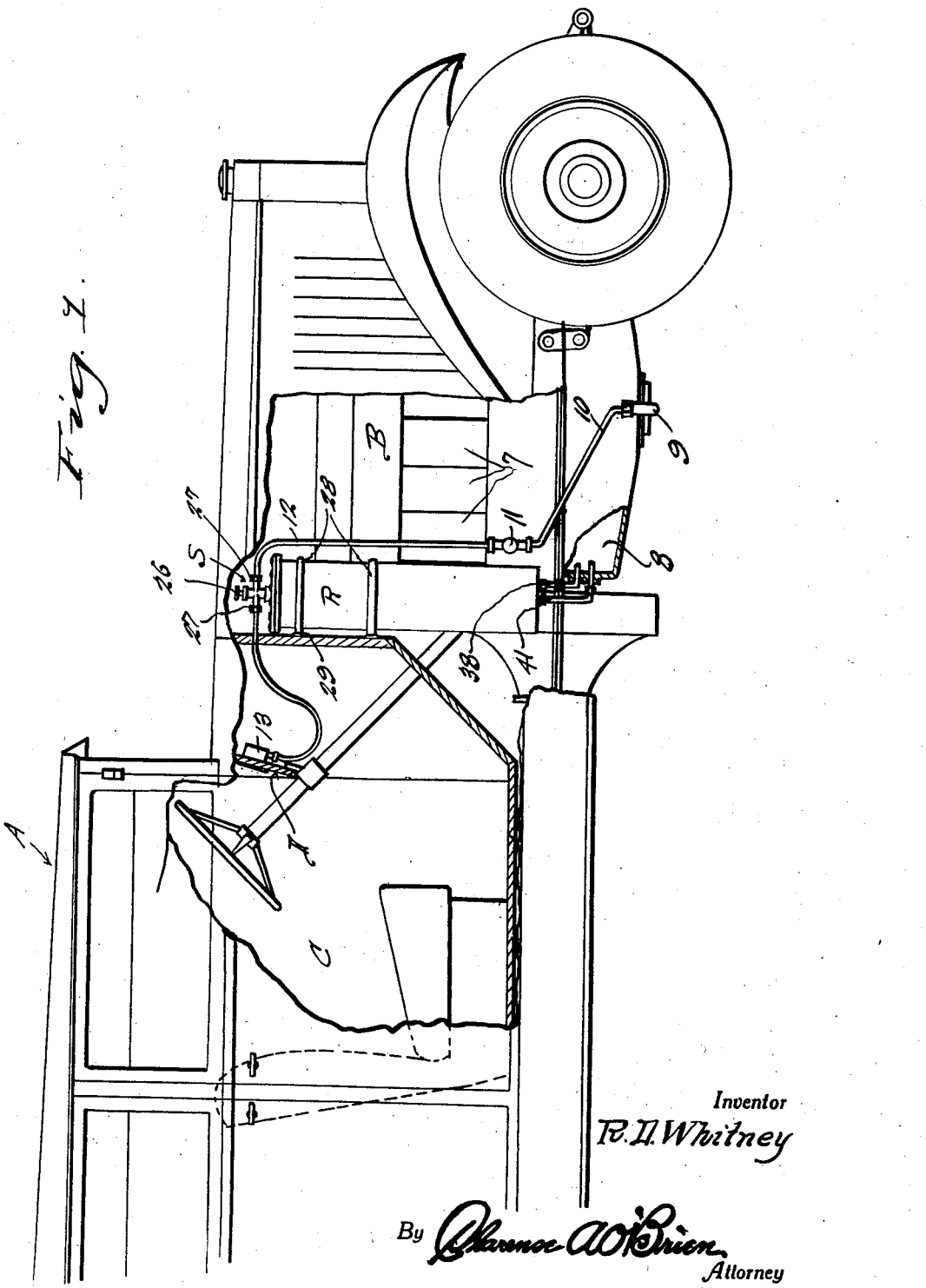

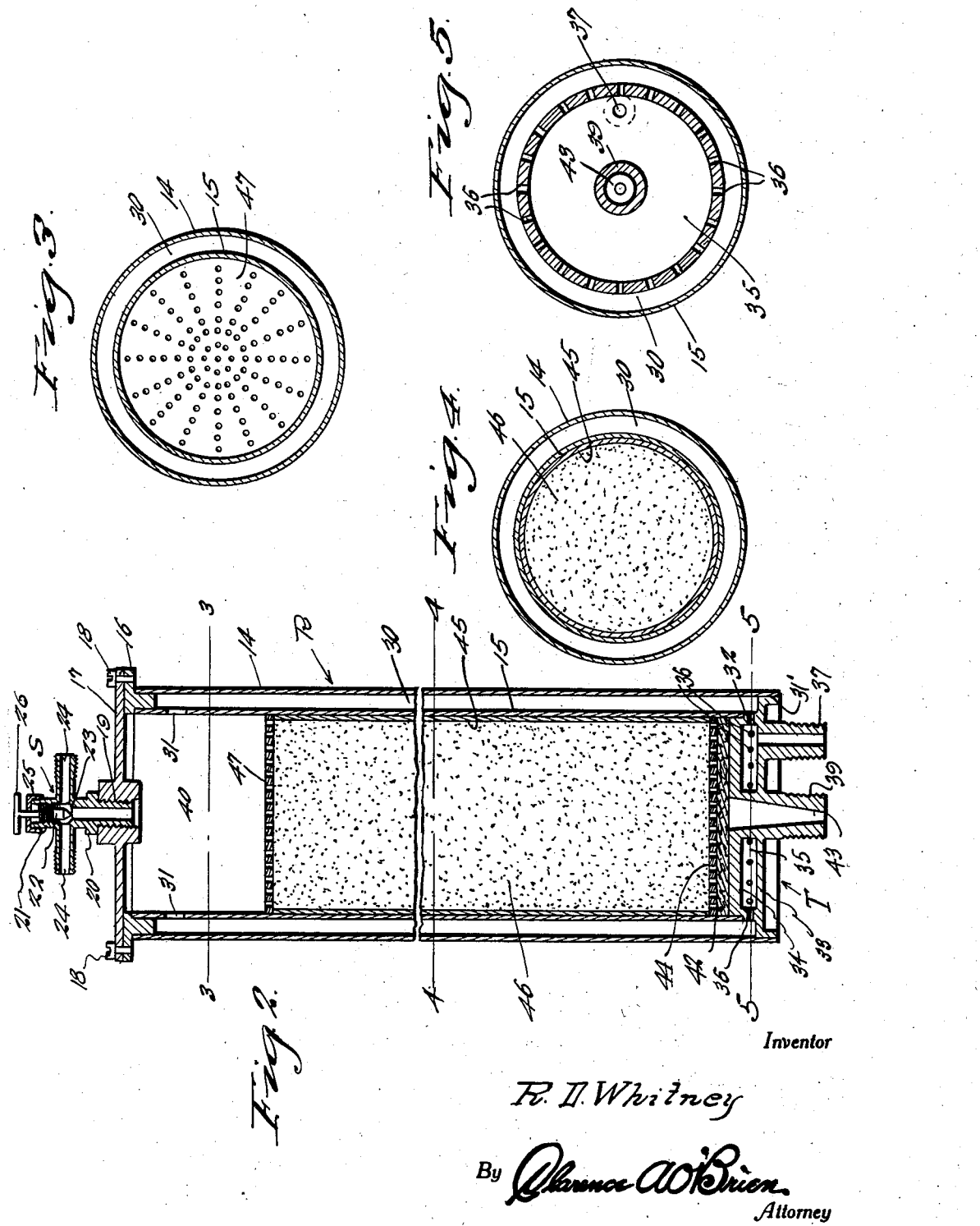

2,106,863

UNITED STATES PATENT OFFICE 2,106,863

DECOLORIZING SYSTEM FOR PURIFICATION OF LUBRICATING OIL IN INTERNAL COMBUSTION ENGINES

Ralph D. Whitney, New York, N. Y.

Application April 26, 1933, Serial No. 668,139

3 Claims. (Cl. 210—131)

This invention relates to means for purifying lubricating oil in use in an internal combustion engine while the oil is being circulated in the engine, and particularly to means for decolorizing said oil as it flows or is pumped through the oil conveying passages of the engine.

An important object of my invention is to provide means of the character described which includes an oil decolorizing unit having an oil decolorizing medium with which the oil is contacted during its circulation in the engine.

It is well known that certain chemically active substances, such as argillaceous clay, hydrous aluminum silicate, and others, have the property of absorbing and otherwise removing the more chemically active constituents from a fluid when the fluid is contacted therewith. It has been established that a rise in temperature accompanies the phenomenon of this absorption of these constituents from a fluid in this manner, and that some of such constituents are more readily absorbed in this manner than others of said constituents. I have found the chemically active absorbents mentioned highly effective in their natural untreated condition, and that if desired, acidulated hydrous aluminum silicate, for instance, may be used which has been washed sufficiently to show an alkaline rather than an acid reaction, adequate to neutralize the acid condition of the used oil which is produced during the operation of the engine, primarily by escape by the pistons of various products of combustion which enter the oil in the crankcase. Chemical tests show that the removal of diluents, carbon, and other color producing impurities from the used oil in accordance with the present invention may reduce a nitrogen content of .761% to .08%, and that an accumulation therein of 2.15% of sulphur may be reduced to .75%. The reduction in the manner described of the deleterious nitrogen and sulphur content of the used oil whereby the used oil is restored to normal condition forms the basis of the present invention.

The operation of the present invention is not concerned with a process of filtration of the oil which depends for its efficacy upon forcing the oil under pressure through mechanical separating agencies for separating out and trapping the deleterious materials. The present invention contemplates the contacting of the used oil at atmospheric pressure with the chemically active absorbent during the circulation of the oil in the engine. The oil, being in a heated condition as a result of circulation in the engine, heats the absorbent, a condition which is required for the most efficient functioning of the absorbent. It has been ascertained by me that contacting the oil with the absorbent at greater than atmospheric pressure reduces the mechanical and chemical efficiency of the absorbent. The invention contemplates the treating of only a small portion of the oil at a time, although continuous circulation thereof is maintained and the treated oil returned preferably directly to the crankcase. The oil may be withdrawn for treatment from any desired point in the engine lubrication system.

In order to clearly distinguish the decolorizing process of this invention from the processes of mechanical filtration employed in other crankcase oil purifying systems, the following passage is quoted from the publication American Petroleum Refining, by H. S. Bell, page 371:—

"The process of removing color and deleterious compounds from lubricating oils, termed filtering, from a strictly technical interpretation, is incorrect.

"Filtration is rightly understood to remove suspended bodies from a fluid by percolation over finely divided material. The particles to be removed are retained on the surface and in the voids of the filter-beds, and the effluent is clarified. The actual decolorization of oil is a process of absorption."

In the drawings, wherein for the purposes of illustration I have shown a crankcase oil purifying system in accordance with my invention:

Figure 1 is a side elevational view of an automobile partly broken away to show the present invention assembled in operative relation to the internal combustion engine.

Figure 2 is an enlarged vertical sectional view through the decolorizing unit per se.

Figures 3, 4, and 5 are horizontal sections taken approximately on the lines 3—3, 4—4, and 5—5, respectively, of Figure 2.

Referring to the drawings in detail A indicates a conventional automobile in the forward part of which is mounted an internal combustion engine B by which the automobile is propelled. While the system is illustrated in connection with an automobile engine, it is equally applicable to tractor engines, and to stationary internal combustion engines utilizing oil circulating pipes or passages. The driver's compartment of the automobile is indicated at C in the front of which is located the instrument panel D.

The internal combustion engine B includes the customary cylinder block 7 and the crank case 8, which latter in the conventional engine forms an oil supply reservoir to which the oil is returned after having been circulated a complete cycle in the engine. The conventional oil pump 9 pumps the oil from the crank case 8 and forces it under suitable pressure through a pipe 10 to a distributing head 11 from which the oil is conveyed by suitable pipes or other conduits, to the parts of the engine to be lubricated. After the oil has lubricated the parts it flows by gravity back into the crank case to be recirculated in the manner described.

In the conventional automobile engine there is an upright pipe 12 which conveys oil under pressure from the head 11 to the oil pressure gauge 13 mounted on the instrument panel D. An upper part of the pipe 12 has interposed therein a fitting which does not obstruct the movement of the oil under pressure to the gauge 13 and embodies an adjustable reducing valve which opens into the top of the decolorizing unit to be described and provides the means whereby the amount and pressure of oil entering the said unit may be exactly regulated.

The decolorizing unit R is formed of an outer casing 14 and a concentrically spaced inner container 15, the upper ends of which are secured and sealed, as by welding, to the opposite sides of an annulus depending from the ring 16. A cover plate 17 is removably secured to the ring 16 by the stud bolts 18 to provide access to the interior of the inner casing 15 to enable removing and replacing the decolorizing material hereafter described. In the center of the cover plate 17 is a threaded opening 19 which receives the standard portion 20 of a cruciform fitting S.

The upper vertical arm 21 of fitting S is threaded to receive the screw valve 22 which is arranged to seat when closed on a rounded shoulder 23 formed at the juncture of the horizontal arms 24 with the standard portion of the fitting. Closing the upper end of the upper vertical arm 21 is a screw cap 25 through which the stem 26 of the valve extends. The outer ends of the horizontal arms 24 of fitting S are removably coupled to the sections of the pipe 12, between which they are interposed, by the unions 27, as shown in Figure 1 of the drawings.

The decolorizing unit R is secured in upright position by means of a pair of straps 28 which embrace the same and are anchored to the dashboard 29. The outer casing 14 and inner casing 15 are spaced from each other to provide an annular oil overflow and oil heating chamber 30. Openings 31 at the top of the inner casing permit oil overflowing from the decolorizing compartment 40 within the inner casing 15 to pass into the heat chamber 30.

The lower end of both the inner casing and outer casing are sealed by a common bottom indicated generally at T which has portions of different diameter defining shoulders 31', 32, respectively, to the periphery of which the bottom ends of the inner and outer casings are welded or otherwise secured. The common bottom T is formed of two horizontal partition walls 33, 34 between which is an annular heat exchange passage 35 which communicates with the lower end of the heating chamber 30 by means of a series of circumferentially spaced passages 36 which open through the shoulder 32. The partition 34 closes the lower end of the inner casing 15 and the outer part of the partition 33 closes the bottom of the outer casing 14 and forms the bottom wall of the passage 35. An outlet nipple 37 depending from the bottom T communicates with the passages 35 and has connected thereto a pipe 38 which returns the overflowed oil to the crank case 8. A treated oil outlet nipple 39 communicating at its upper end with the interior of the inner casing, traverses the partition 33, the passage 35, and the partition 34 and depends below the bottom T where it has connected thereto a pipe 41 which returns the treated oil to the crank case 8.

Upon the partition 34 constituting the bottom of the inner casing 15 is placed a felt disk 42 whose office is to prevent loose decolorizing material from passing into the inverted conical passage 43 in the outlet pipe 39. On top of this disk rests a non-corrosive perforated metal plate 44. For convenience in placing and removing the decolorizing material, it may be made into a cartridge having an outer covering of waxed paper 45. The active material 46 may be amorphous argillaceous clay, hydrous aluminum silicate, or other similar chemical absorbent. If desired, loose active material may be used in the container, that is, active material in loose condition. A normal charge of the decolorizing material fills the decolorizing chamber 40 about three-quarters full and upon the top of the material a perforated metal plate 47 is placed.

The oil entering the top of the decolorizing unit falls upon the perforated plate 47 and then percolates downwardly through the decolorizing material 46 by gravity alone. The decolorizing chamber 40 being in heat exchange relation with the chamber 30 and with the passage 35, the active material 46 is adequately heated by the oil to operate at high efficiency. Until the decolorizing material has become adequately heated the oil will not pass therethrough in volume but will rise and overflow through the openings 31, chamber 30, openings 36, chamber 35, and outlet 37 and return to the crank case. When adequately heated the material 46 passes a larger portion of the oil which is thereby purified and returned to the crankcase.

While the invention has been described herein in detail, it is to be understood that changes, variations and modifications thereof may be resorted to without departing from the spirit of the invention and the scope of the subjoined claims.

Having thus described my invention, what I claim as new is:

1. An oil decolorizing device comprising a pair of oil containers having substantially imperforate side walls one of said containers having a portion thereof disposed within the other container, at least one wall of the said portion of the said one container being arranged in spaced relation to at least one wall of the said other container thereby defining a heat exchange chamber, one of said containers being formed with passage means communicating with said heat exchange chamber, each of said containers being formed with outlet means, and one of said containers being formed with inlet means, and means for preventing flow of oil from one of said outlet means to the other.

2. A device for decolorizing used crankcase oil, said device comprising a container arranged to receive the oil while hot and at atmospheric pressure, said container containing material active only while heated to adsorb coloring matter from the oil and inactive and impervious while unheated and having a first outlet for the oil which has passed through said material, a second container surrounding and spaced from the first container and thereby defining a chamber in receiving relation to hot oil caused to accumulate in the first container by the failure of said material to pass oil while impervious and inactive, said first container being formed with opening means spaced from said first outlet permitting the accumulated oil to overflow into said chamber, said chamber holding such overflowed hot oil in heat exchange relation to said material so as to render said material pervious and active with respect to the oil entering the first container, said chamber having a second outlet, and means preventing flow of oil between said first and second outlets.

3. In a filter, a casing, a container disposed within the casing having imperforate side walls and a perforate end wall, the imperforate side walls of the container being spaced from the side walls of the casing, filtering material within the container, an inlet adjacent one end of the casing communicating with the perforated end wall of the container and with the space between the side walls of the casing and container, an outlet from the container adjacent the end of the container opposite the perforated end wall thereof, and a separate outlet from the casing communicating with the space between the side walls of the casing and the container adjacent the opposite end of the casing from the inlet, and means for preventing fluid passing through the outlet from the filter container from passing through the outlet from the casing and for preventing fluid passing from the outlet from the casing from passing through the outlet from the container.

RALPH D. WHITNEY.